Patented July 30, 1946

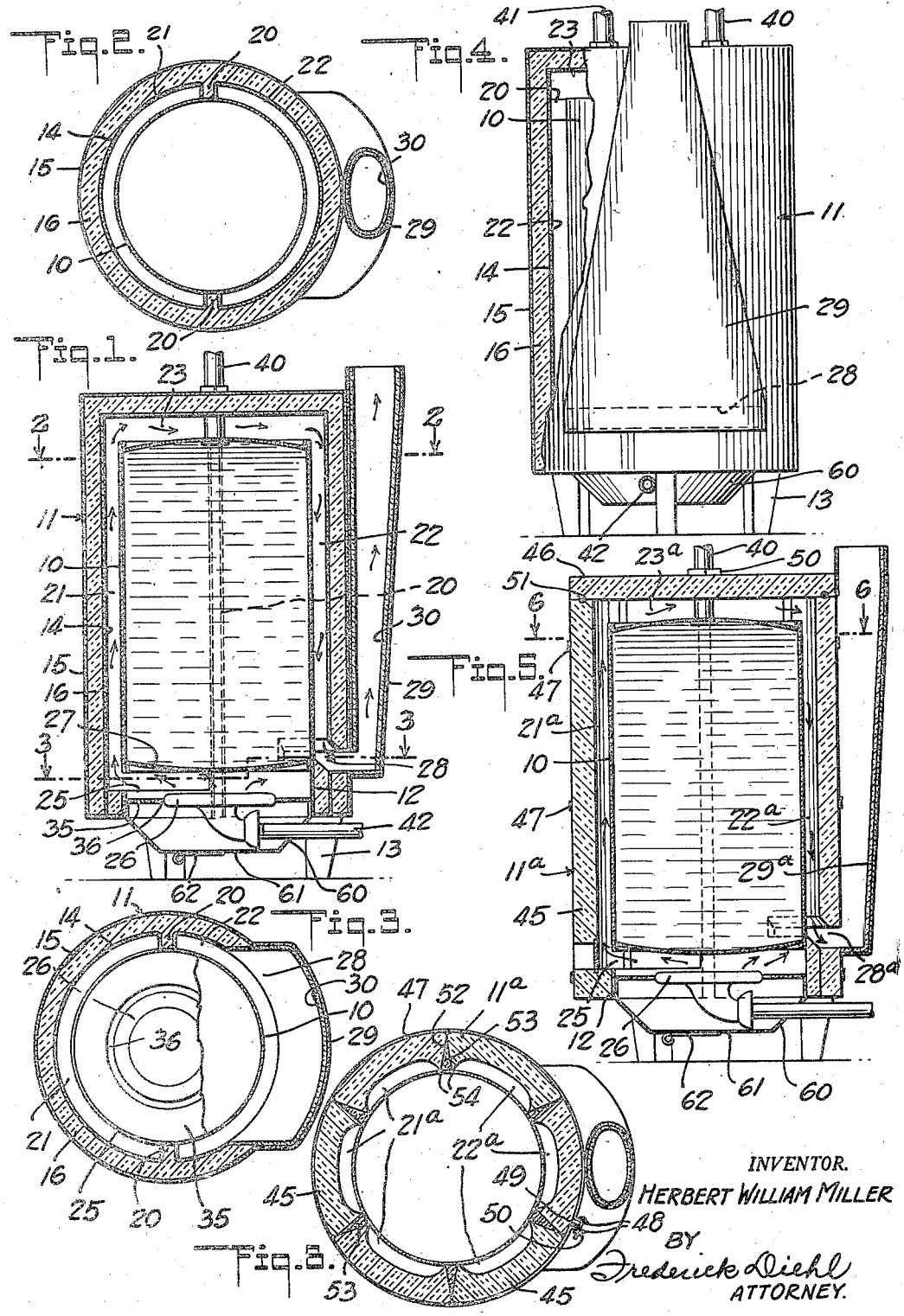

2,404,860

UNITED STATES PATENT OFFICE 2,404,860

WATER HEATER

Herbert William Miller, Burbank, Calif.

Application December 17, 1942, Serial No. 469,378

5 Claims. (Cl. 126—350)

This invention relates generally to heat exchange apparatus and more particularly to water heaters of the storage type.

The primary object of the invention is to provide a water heater of the storage type which is structurally and functionally characterized to enable the following advantages to be attained:

(1) To permit a greater input of fuel in proportion to the water storage capacity of the heater than is possible with external heating types of water heaters heretofore used.

(2) To effect a more efficient diffusion of heat into the water tank by proper control of burner heat and by causing the concentrated gases from the burner to traverse practically the entire exterior of the water tank, all without the use of extraneous devices such as risers, flues, baffles, coils and etc., with the attending saving of metal and the labor of fabricating and assembling.

(3) To efficiently maintain the water at a preselected temperature which can be materially higher than is the usual practice, to the end of permitting the use of a heater of smaller water capacity and more compact construction for a given water heating output per unit of time, thus resulting in a saving of metals.

(4) To reduce the standby loss to a minimum by trapping the radiated heat from the water tank and confining the heat against premature discharge by the absence of a top vent, all in contrast to present type heaters wherein the extinguishing of the burner under the usual thermostatic control, results in the heating surfaces tending to become cooling surfaces by the action of a self-induced draft caused by ascending heat currents rising by natural thermal action through an upper vent and being replaced by cold air from the floor, thus rapidly dissipating the heat and necessitating continual reheating of the stored water to maintain same at a predetermined temperature.

(5) To insure a more concentrated heat to act upon the heating surface of the water tank, by restricting the volume of air around the burner to the quantity required as secondary air for complete combustion, as compared to present practice in which the hot burner gases are diluted by slightly heated excess air drawn thereinto, caused by heat radiating downward from the burner, and thus constituting a parasitic load reducing heating efficiency.

(6) To maintain efficient stack action under any and all operating conditions by reducing the rate of heat absorption in the stack, as compared to an uninsulated metal stack.

With this and other objects in view, the invention resides in the combinations, arrangements and functional relationships of elements as set forth in the following specification and particularly pointed out in the appended claims.

In the accompanying drawing,

Figure 1 is a vertical central sectional view of one form of water heater embodying this invention;

Figures 2 and 3 are horizontal sectional views taken respectively, on the lines 2—2 and 3—3 of Figure 1;

Figure 4 is a view in rear elevation partly in section, of the form of water heater shown in the preceding figures;

Figure 5 is a view similar to Figure 1 and illustrating a second form of heater embodying this invention;

Figure 6 is a horizontal sectional view taken on the line 6—6 of Figure 5.

Referring specifically to the drawing and particularly to Figures 1 to 4 inclusive, this form of the invention is composed of a cylindrical metal tank 10 which is vertically disposed and is enclosed in a heat insulating jacket 11. The tank 10 can be of the floating type or the non-floating type as illustrated, with its lower end provided with a skirt 12 having legs 13 which support the tank and its enclosing jacket elevated from the floor.

In the present instance the jacket 11 is built up from sheet metal to provide inner and outer walls 14 and 15 respectively, with a filler 16 of rock wool or other insulation therebetween. The jacket encloses the side and top of the tank and is spaced therefrom as clearly shown in Figure 1.

Vertical partitions 20 project at diametrically opposed locations from the inner wall 14 of the jacket and tank as shown in Figures 2 and 3, and preferably terminate at the top of the tank as shown in Figure 4, all to the end of defining a semi-circular duct 21 around the tank for ascending burner gases; a semi-circular duct 22 for descending burner gases; and a connecting duct 23 across the entire top of the tank.

The skirt 12 is provided with a substantially semi-circular slot constituting an inlet 25 to the lower end of the duct 21, through which hot gases discharging from a gaseous or other fuel burner 26 enter the duct after impinging against the bottom wall 27 of the tank. At the lower end of the duct 22 the jacket 11 is provided with a substantially semi-circular slot constituting an outlet 28 from the duct 22 and communicating with a vent pipe 29 which is provided with a liner 30 of heat insulating material. The cross sectional contour of the pipe 29 changes from a concavo-convex form at the outlet 28 to a circular form at the top of the heater for connection thereat to the usual stack (not shown) leading to the outer atmosphere.

Projecting from the skirt 12 at or about the level of the burner 26 is a metal valve plate 35 which is spaced from the burner to define a passage 36 of a predetermined cross sectional area around the burner, which restricts the volume of air to that required as secondary air for complete combustion, thus preventing dilution of the burner gases by an excess amount of air, whereby to insure a more concentrated heat from the burner to act upon the heating surface of the tank 10.

Conventional thermostatic controls (not shown) will be provided to control the supply of fuel to the burner so that the water in the tank can be maintained at a preselected temperature in the operation of the invention which is as follows:

With the burner 26 in operation, the requisite quantity of secondary air for complete combustion is supplied to the burner through the valved passage 36. The concentrated hot gases from the burner impinge against the bottom wall 27 of the tank 10 and then pass through the inlet 25 into the duct 21, connecting duct 23, duct 22, outlet 28, vent pipe 29 and thence into the stack.

By eliminating a top vent and forcing the burner gases to come in contact with the relatively large heating surface presented by practically the entire area of the tank, the maximum exchange of heat is effected, it being noted that there exists a tendency to confine the gases around the tank by the location of the outlet 28 at the lowermost point of the duct 22, to the end that the spent gases will discharge into the pipe 29 with only sufficient heat energy for proper stack action. It will also be noted that by insulating the interior of the vent pipe and stack, the rate of heat absorption therein is reduced sufficiently to maintain efficient stack action under any and all operating conditions.

Reference will now be had to Figures 5 and 6 which illustrate a second form of the invention identical in principle and operation to the form above described, and structurally differing from the latter solely in the construction of the heat insulating jacket 11a enclosing the water tank 10, which construction eliminates the metal walls 14 and 15 and substitutes therefor a number of curved slabs or segments 45 and a cap plate 46 of a solid form of heat insulating material.

The slabs 45 are clamped rigidly around the periphery of the tank 10 by metal bands 47 having ears 48 through which pass screws 49 provided with nuts 50. The inner sides of the slabs 45 are provided with longitudinally extending recesses, which, in the assembled position of the slabs on the tank, co-act with the wall of the latter in defining ducts 21a and 22a for ascending and descending gases from the burner 26, and a connecting duct 23a between the cap plate 46 and the top wall of the tank.

In the present instance six of the slabs 45 are shown, with the ducts 21a in three thereof and communicating with the inlet 25 of the skirt 12, whereas the ducts 22a of the other three slabs communicate with the outlet 28a formed in the latter as illustrated in Figure 5, so as to discharge spent gases into the vent pipe 29a, all in the identical operation and with all the advantages previously described.

The cap plate 46 can be secured in place in any suitable manner such as by utilizing nuts 50 on the hot and cold water connections to clamp the plate against the upper ends of the slabs with a suitable gasket or sealing insulation 51 interposed therebetween. It will be noted that the longitudinal edges of the slabs are beveled so that wedge shaped spaces 52 are formed between adjacent slabs to receive a plastic form of insulating material 53, which, when set, forms a perfect seal against the escape of burner gases at the joints between slabs.

Furthermore, the slabs bear against the wall of the tank on knife edges 54 which crush readily under clamping pressure of the bands 47 so as to accommodate the slabs to any surface irregularities on the tank wall, and thus seal the edges of the slabs against the tank. Also, the crushing of the edges 54 permits the slabs to become jammed tightly against each other to further insure sealing of the joints between the slabs against leakage of burner gases.

It will be noted that in both forms of the invention, the total amount of air supplied to the burner 26 is regulated by the provision of a bottom pan 60 having an air opening 61 controlled by a slide valve 62 which is manually adjustable to vary the size of the opening 61 in accordance with the requirements of different fuels and of air pressures at various altitudes.

I claim:

1. In a water heater, a vertically elongated water tank having hot and cold water connections; a gas burner disposed in heating relation to the bottom of the tank; a heat insulating jacket enclosing the tank and spaced from the side and top of the latter; means co-acting with the tank and jacket to divide the space around the side of the tank vertically into a duct for ascending gases from the burner and a second duct for descending gases, with the space above the top of the tank defining a connecting duct between the first and second ducts; means defining an inlet to the first said duct at a location beneath the tank for the entrance of hot gases from the burner; means defining an outlet from the second said duct at a low level relatively thereto, whereby to force burner gases to flow through the second said duct in a direction counter to the natural thermal circulation in order to promote a maximum exchange of heat between the gases and the tank before the gases discharge from the outlet; and means critically restricting the volume of air at all burner flame ports to the quantity required as secondary air for complete combustion so as to prevent dilution of the hot burner gases by excess air.

2. In a water heater, a vertical water tank, a gas burner disposed at the bottom of the tank; means defining a vertical duct for ascending gases along the side of the tank, having an inlet through which hot gases from the burner enter the duct; means defining a second vertical duct for descending gases along the side of the tank having an outlet for spent gases at a relatively low level; means defining a connecting duct between the ascending gas duct and descending gas ducts across the top of the tank; and means critically restricting the volume of air at all burner flame ports to only the quantity required as secondary air for complete combustion so as to prevent dilution of the hot burner gases by excess air.

3. In a water heater, a water tank; a gas burner beneath the tank; means defining heat exchanging vertical ducts laterally spaced around the vertical side of the tank and a connecting duct across the top of the tank; means defining an inlet to one of said vertical ducts for the entrance of hot gases from the burner; means defining an outlet from another of the vertical ducts, located at a low level relatively thereto for the discharge of spent gases; and means critically restricting the volume of air at all burner flame ports to only the quantity required as secondary air for complete combustion so as to prevent dilution of the hot burner gases by excess air.

4. In a water heater, a vertical water tank; a burner arranged at the bottom of said tank; a heat insulating jacket enclosing the vertical side and the top of said tank in spaced relation to the top and including a plurality of segments having longitudinal recesses co-acting with the tank wall to define ducts for hot gases from the burner; means for clamping the segments to the water tank with the joints between adjacent segments and between the segments and the tank wall sealed against the escape of burner gases; means defining an inlet to certain of said ducts through which hot gases from the burner ascend to the space at the top of the tank; and means defining an outlet from certain others of the ducts at the lower ends of the latter, through which spent gases discharge after circulating through the ducts and top space in heat exchanging relation to the tank wall.

5. In a water heater, a vertical water tank; a burner arranged at the bottom of the tank; a heat insulating jacket enclosing the vertical side and the top of the tank in spaced relation to the top and including a plurality of segments having longitudinal recesses co-acting with the tank wall to define ducts for hot gases from the burner; means for securing the segments to the water tank with the joints between adjacent segments and between the segments and tank wall sealed against the escape of burner gases; means defining an inlet to certain of said ducts through which hot gases from the burner ascend to the space at the top of the tank; means defining an outlet from certain others of the ducts at the lower ends of the latter, through which spent gases discharge after circulating through the ducts and top space in heat exchanging relation to the tank wall; the inner longitudinal edges of adjacent segments being sufficiently thin to be crushed by irregularities on the tank wall so as to form sealing joints, and being spaced from each other to provide intervening sealing spaces; and a filler of sealing material in said sealing spaces.

HERBERT WILLIAM MILLER.